Sept. 20, 1960     L. O. CARLSEN     2,953,068

TOOL MECHANISM FOR GEAR CUTTING MACHINE

Filed Dec. 19, 1958     3 Sheets-Sheet 1

INVENTOR.
LEONARD O. CARLSEN
BY
*Richard W. Treverton*
ATTORNEY

Sept. 20, 1960 L. O. CARLSEN 2,953,068
TOOL MECHANISM FOR GEAR CUTTING MACHINE
Filed Dec. 19, 1958 3 Sheets-Sheet 2

Sept. 20, 1960         L. O. CARLSEN         2,953,068
TOOL MECHANISM FOR GEAR CUTTING MACHINE
Filed Dec. 19, 1958         3 Sheets-Sheet 3
FIG. 4
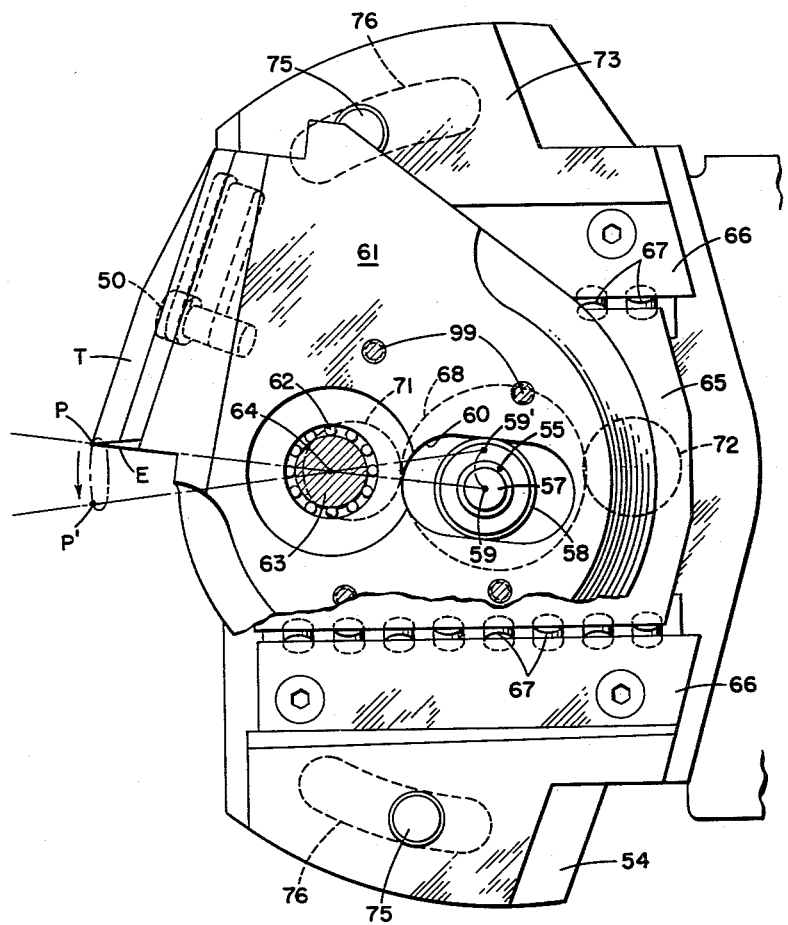
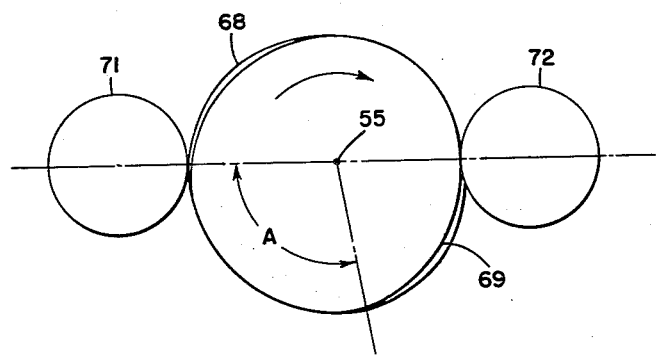
FIG. 5

United States Patent Office 2,953,068
Patented Sept. 20, 1960

2,953,068

TOOL MECHANISM FOR GEAR CUTTING MACHINE

Leonard O. Carlsen, Rochester, N.Y., assignor to The Gleason Works, Rochester, N.Y., a corporation of New York Filed Dec. 19, 1958, Ser. No. 781,590

9 Claims. (Cl. 90—6)

The present invention relates to machines for cutting straight toothed gears, especially straight and skew bevel gears, with stroking tools.

It has been known heretofore to provide machines of this kind with a pair of tools arranged for alternate cutting, so that one tool cuts while the other is returning, and with each tool moving in an approximately elliptical path, the direction of major extent of such path being lengthwise of the tooth space being cut. The primary objective of the present invention is to improve the tool supporting and actuating mechanism of such machines, to thereby improve the cutting action. A gear cutting machine according to the invention comprises a tool head, a slide reciprocable in the head, a tool carrier pivoted to the slide for swinging motion about an axis perpendicular to the direction of such reciprocation, a crank rotatable in the head and having its crank pin arranged to swing the tool carrier back and forth about said axis upon rotation of the crank, and means to reciprocate the slide in time with such rotation. The slide is stationary when the tool is cutting and provides a firm support on which the carrier pivots during such cutting to cause the tool to move along the arc of a circle. This has the advantages that the clearance angle between the tool and the cut surface of the work, back of the tool's cutting edge, remains constant throughout the cutting stroke and that the tooth surfaces which are produced may exactly duplicate tooth surfaces produced by gear cutting machines having disc type milling cutters.

The preferred embodiment of the invention is shown in the accompanying drawings, wherein:

Fig. 4 is a view in plane 4—4 of Fig. 3 with a cover part omitted; and

Fig. 5 is a diagram of a cam and cam followers which are parts of the tool supporting and actuating mechanism, this diagram being in a plane parallel to plane 4—4 of Fig. 3.

Figure 1:
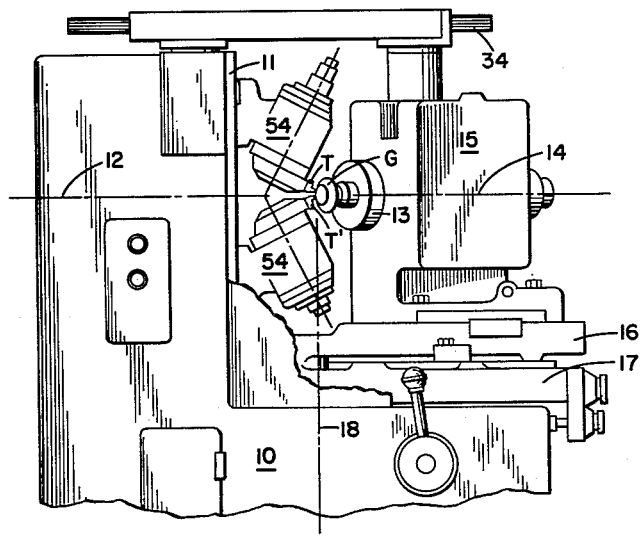
Fig. 1 is a fragmentary front elevation and Fig. 2 a drive diagram of the machine.
Figure 2:
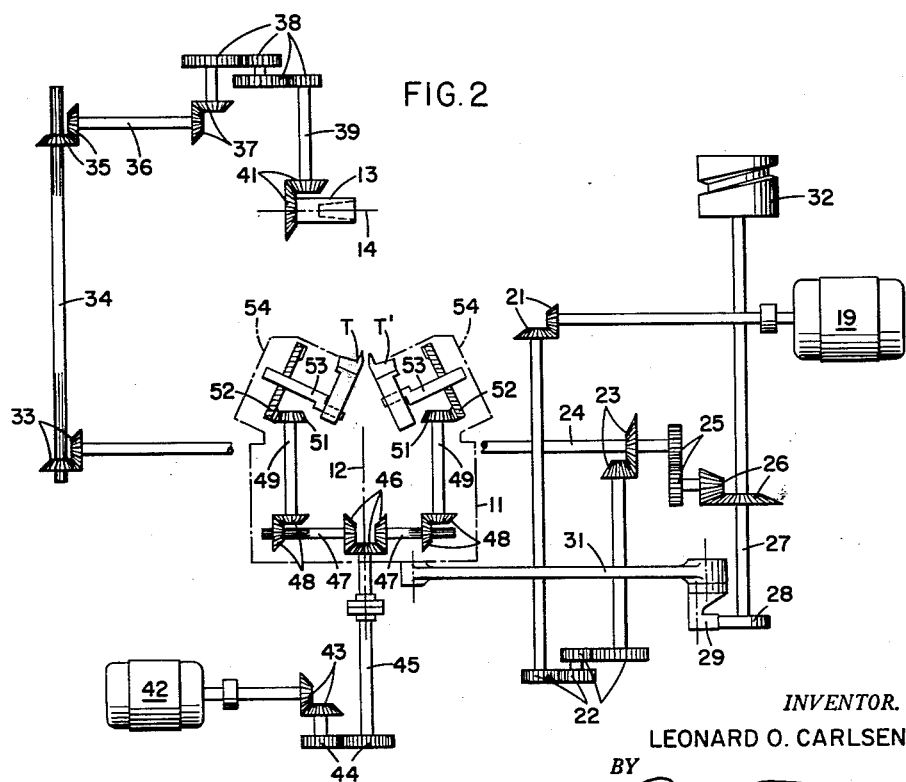

Referring to Figs. 1 and 2, the machine comprises a frame 10 supporting a tool-carrying cradle 11 for rotation about horizontal axis 12, the tools being designated T and T'. The work gear G, in this case a bevel gear, is chucked to a work spindle 13 that is rotatable about its axis 14, which also is horizontal, in a work head 15. The work head is adjustable rectilinearly in the direction of an axis 14 on a swinging base 16 that in turn is adjustable angularly on a sliding base 17 about a vertical axis 18 which intersects axes 12 and 14 at a common point. The sliding base is adjustable, and also movable for feed of the work relative to the tools, rectilinearly on frame 10 in the direction of cradle axis 12. By these several adjustments the cone apex of the gear G may be brought into coincidence with the intersection point of axes 12, 14 and 18.

In operation the cradle 11 is rotated back and forth about axis 12 in time with rotation of the work spindle 13 by a generating train driven by a motor 19 through bevel gears 21, rate-of-roll change gears 22, and bevel gears 23. The generating train comprises a main shaft 24, gears 25, bevel gears 26, shaft 27, cam 28, a bell crank lever 29 oscillated by the cam, and a pitman 31 pivotally connecting the lever 29 to the cradle, whereby for each turn of shaft 27 and cam 28 the cradle is given one oscillation about its axis 12. The cam 28 is so shaped that the part of the generating swing or roll of the cradle during which actual cutting occurs is in constant velocity ratio to the rotations of shafts 24, 27, and that the return roll is at a faster although varying rate. A feed cam 32 on shaft 27 is arranged to act, through means not shown, to advance the sliding base to bring the work gear into cutting position at or prior to the cutting portion of the generating roll of the cradle and to withdraw the slide, to move the work clear of the tools, before the return roll begins. The generating train further comprises bevel gears 33, overhead shaft 34, bevel gears 35, shaft 36, bevel gears 37, index change gears 38, shaft 39, and a pair of bevel gears 41 of which the driven member is on work spindle 13. With the arrangement described, the indexing of the work is effected by the continuing rotation of the work spindle during the return roll of the cradle, whereby during each successive generating roll the tools T, T' cut in a succeeding tooth space of the work gear although usually not the next succeeding space.

In the embodiment shown the tools are driven by a motor 42 through bevel gears 43, tool speed change gears 44, shaft 45 coaxial with cradle axis 12, bevel gears 46, shafts 47, bevel gears 48, shafts 49, bevel pinions 51, gears 52 and shafts 53. The latter shafts are respectively connected to the tools T and T' by the tool supporting and actuating mechanisms housed in tool heads 54. These heads are adjustable on the cradle 11 in such manner that the two tools may represent one tooth of a generating gear of any size and shape within the range of the machine. For this purpose the shafts 49, 49 and gears 48, 48 are adjustable with their respective heads radially and angularly relative to the cradle.

Figure 3:
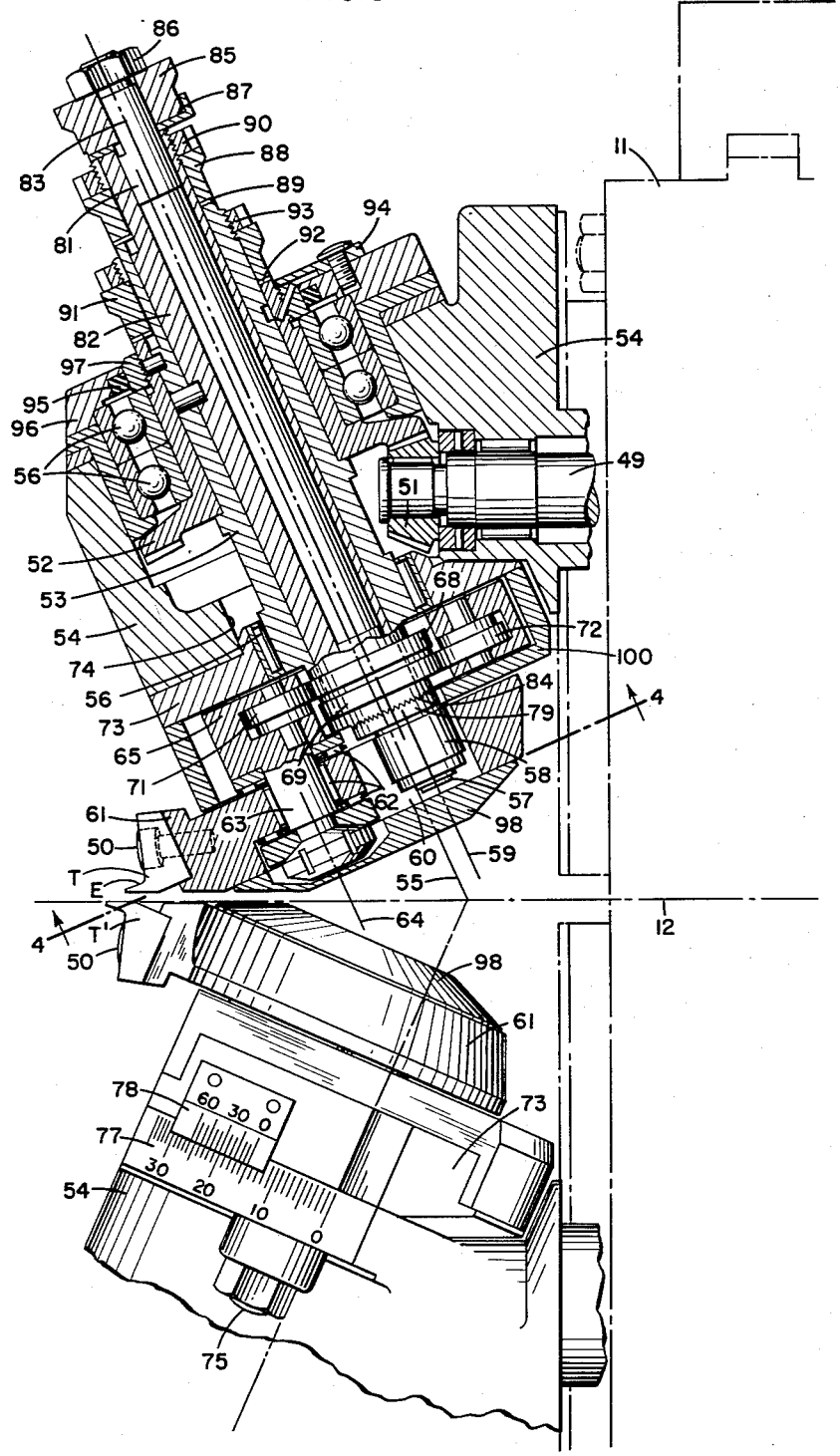
Fig. 3 is a view of the tool supporting and actuating mechanism on a larger scale, the view being partly in section in a plane parallel to the plane of Fig. 1.

The upper and lower heads 54 which respectively carry the tools T and T', including the mechanisms in the heads, are essentially symmetrical relative to each other and hence the structure of both will be understood from the following description of the upper one. Referring to Figs. 3 to 5, the shaft 53 is rotatable as a unit with gear 52 in the head 54 about axis 55, being supported for such rotation by anti-friction bearings 56. Carried by the shaft is a crank pin 57 having a roller 58 supported thereon on anti-friction bearings (not shown), the axis of the pin and roller, designated 59, being eccentric of axis 55. The crank roller engages in a slot 60 in a carrier 61 on which the tool T is received. The carrier is supported on anti-friction bearings 62 for oscillation about a pivot pin 63 whose axis is 64. The pin is integral with a slide 65 that is movable rectilinearly relative to the head 54 along guideways 66, being supported for such motion by roller bearings 67. The rectilinear motion of the slide is effected by cams 68 and 69 which are integral with shaft 53 and respectively engage follower rollers 71 and 72 carried by the slide. The rectilinear motion of the slide is in the plane of rotation of the crank pin 57, i.e. plane 4—4 of Fig. 3, and in a direction to advance or withdraw the tool T relative to the gear being cut.

Cams 68 and 69 are so shaped that both are in continuous contact with their respective follower rollers, that the slide 65 is held against motion relative to head 54 during the cutting stroke of the tool, that the slide is rapidly withdrawn to move the tool, at the conclusion of each cutting stroke, to a position clear of the cutting-stroke path of the other tool, and that the slide is rapidly advanced to bring the tool into cutting position just prior to its next cutting stroke. During the actual cutting, the shaft 53 rotates clockwise in Figs. 4 and 5 through angle A about its axis 55 while the axis of roller 58 is swung from position 59 to position 59', thereby swinging the carrier 61 and tool T about axis 64 as the point of the tool is moved from P to P'. During this motion dwell portions of cams 68, 69 engage rollers 71, 72, holding the slide 65 and pivot axis 64 stationary relative to head 54 so that although the path of the tool considered in its entirety is of the approximately elliptical shape shown in Fig. 4, the portion of this path during which actual cutting occurs, from P to P', is the arc of a circle. Accordingly the tooth surface produced by side-cutting edge E of the tool is the same as would be produced by a milling cutter with an equivalent side-cutting edge rotating about axis 64. The tool, T or T', is secured to its tool carrier 61 by a screw 50 which extends through an elongated slot in the tool, whereby after the tool is resharpened it may be adjusted to bring its point P to the position shown, i.e. to the plane common to axes 59 and 64.

As shown in Fig. 3 the direction of reciprocation of slide 65 is at an acute angle to the plane of rotation of the cradle about its axis 12. This angle corresponds approximately to the complement of the effective pressure angle of the side-cutting edge of the tool T. Hence the tool pivot axis 64, which is perpendicular to the direction of slide reciprocation, is inclined to the plane of rotation of the cradle by an angle which is approximately equal to the tool's effective pressure angle. In case there is exact equality, the side-cutting edge of the tool moves in a plane perpendicular to axis 64, producing gear tooth surfaces which are straight from end to end. However the tool pressure angle is preferably slightly less than the angle between the tool pivot axis and the plane of cradle rotation, in practice about two to four degrees less, so that the side-cutting edge of the tool describes a shallow conical surface as it cuts, thus producing gear tooth surfaces that are slightly crowned from end to end, which has the effect of localizing the tooth bearing.

The direction of the rectilinear motion of slide 65 in the plane of rotation of crank pin 57 may be varied, to thereby vary the mean direction of the cutting stroke P—P' of the tool in relation to the head 54. For this purpose the guideways 66 are supported by a plate 73 which is angularly adjustable on the head, the plate having a hub rotatable in a bore 74 in the head which is coaxial of axis 55. Screw-threaded studs 75 anchored to the plate extend through arcuate slots 76 in the head. Upon loosening nuts threaded to these studs, which clamp the plate to the head, the angular adjustment may be effected. The position of adjustment is shown by a scale and vernier, 77, 78, secured respectively to the head and plate.

The length of the cutting stroke of the tool may be varied by adjusting the eccentricity of crank pin axis 59 from the crank rotation axis 55. For this purpose the crank assembly comprising crank shaft 53 and crank pin 57 is made adjustable, the crank pin 57 being carried by a crank cheek 79 on the end of a shaft 81 that is rotatably adjustable in an eccentric bore in a sleeve 82 that in turn is rotatably adjustable in tubular shaft 53 about axis 55. Axis 83, about which shaft 81 is adjustable in the sleeve, is equidistant from axes 55 and 59, whereby adjustment of the shaft enables the eccentricity of the crank pin axis 59 relative to axis 55 to be adjusted to various distances, ranging from zero to the maximum. The crank cheek 79 and the adjacent end of sleeve 82 have mating face clutch teeth 84. The eccentricity adjustment is made by turning the shaft 81 in the sleeve by means of a dial 85 keyed to the shaft, after first loosening a nut 86 that is screw-threaded to the shaft, such loosening permitting separation of the mating clutch teeth. The position of crank pin eccentricity is shown by calibrations on the dial 85 and a cooperating pointer 87 that is keyed to sleeve 82.

In order to re-establish the correct phase relation between the crank pin and the cams 68, 69 after a crank eccentricity adjustment, the sleeve 82 may be adjusted angularly in the shaft 53 by turning a calibrated dial 88 that is keyed to the sleeve. The dial and the shaft have mating face coupling teeth 89 which must be separated, as permitted by loosening a nut 90 screw-threaded to the sleeve, before the dial and sleeve can be turned. The dial 88 has calibrations thereon which may be read in conjunction with a suitable marking on the adjacent part of the sleeve.

In order to restore the phase relation between the stroking of the upper and lower tools T and T' after adjustment of the heads 54 on the cradle, the shaft 53 in at least one of the two heads is adjustable angularly relative to the related gear 52. For this purpose a marked dial 91 is keyed to the shaft and is provided with face coupling teeth 92 mating with teeth formed on the adjacent end of the hub of gear 52. The mating clutch teeth are releasably held in inter-engagement by a nut 93 screw-threaded to the shaft back of the dial. By means of a pointer 94 on the head and related mark on the dial 91, the angular position of the shaft relative to the gear may readily be determined.

The moving parts in the head 54 are protected from foreign matter by a sealing ring 95, Fig. 3, disposed between the outer plate 96 of the head and a bearing retainer ring 97 screw-threaded to the hub of gear 52; by a plate 98 secured to tool carrier 61 by fasteners 99, Fig. 4; and by a cover 100, Fig. 3, for the slide 65. This cover is omitted in Fig. 4.

I claim as my invention:

1. A gear cutting machine comprising a rotatable cradle carrying a pair of tool heads, each head supporting a slide for reciprocation in a direction inclined to the plane of rotation of the cradle at an acute angle corresponding at least approximately to the complement of the effective pressure angle of the cutting tools, a tool carrier pivoted to each slide for swinging motion about an axis perpendicular to said direction of reciprocation, a crank having its shaft rotatable in each head on an axis parallel to the pivot axis and having its crank pin arranged to swing the tool carrier back and forth about its pivot axis upon crank rotation, and means to reciprocate the slide in time with such swinging motion.

2. A gear cutting machine comprising a tool head, a slide reciprocable in the head, a tool carrier pivoted to the slide for swinging motion about an axis perpendicular to the direction of such reciprocation, a crank rotatable in the head and having its crank pin arranged to swing the tool carrier back and forth about said axis upon rotation of the crank, and means to reciprocate the slide in time with such rotation.

3. A machine according to claim 2 in which said means comprises a cam connected to and rotatable in unison with the crank.

4. A machine according to claim 3 in which the cam has a dwell portion operative during the part of the swinging motion in which the tool cuts, and an active portion effective to hold the slide withdrawn during the return portion of the swinging motion.

5. A machine according to claim 3 in which the active portion of the cam is arranged to commence withdrawal of the slide prior to the end of the swing of the carrier during which cutting occurs, and to conclude a subsequent advance of the slide during the initial portion of the subsequent cutting swing, whereby the tool follows an approximately elliptical path of which the cutting portion is an arc of a circle.

6. A machine according to claim 3 in which there is a means to adjust the angular reltaionship, about the axis of rotation of the crank, between the cam and the crank pin.

7. A machine according to claim 2 in which there is a means to adjust the eccentricity of the crank pin to thereby vary the arc of swing of the tool carrier.

8. A machine according to claim 2 in which there is a guide supporting the slide for reciprocation, such guide being adjustable angularly on the related head about the axis of rotation of the crank shaft.

9. A gear cutting machine comprising a rotatable cradle, a pair of tool heads adjustable on the cradle in the plane of the cradle rotation, each head supporting a guideway, a slide reciprocable in each guideway in a direction inclined to said plane at an acute angle corresponding at least approximately to the complement of the effective pressure angle of the cutting tools, a tool carrier pivoted to each slide for swinging motion about an axis perpendicular to said direction of reciprocation, a crank having its shaft rotatable in each head on an axis parallel to the pivot axis and having its crank pin arranged to swing the tool carrier back and forth about its pivot axis upon rotation of the crank, a cam on each crank shaft arranged to reciprocate the slide in time with such swinging motion, said cam having a dwell portion for holding the slide stationary in its head while the tool thereon is cutting, and each guideway being adjustable on the head about the axis of rotation of the crank shaft.

References Cited in the file of this patent
UNITED STATES PATENTS

| | | |
|---|---|---|
| 2,668,480 | Christman | Feb. 9, 1954 |
| 2,895,384 | Baxter et al. | July 21, 1959 |